United States Patent [19]
Maréchal et al.

[11] Patent Number: 4,566,427
[45] Date of Patent: Jan. 28, 1986

[54] DEVICE FOR CUTTING BLOCKS OF GRANITE, MARBLE, STONE AND THE LIKE MATERIALS

[75] Inventors: Roger Maréchal, Nuits sur Armançon; Lucien Jeantet, Enghien, both of France

[73] Assignee: Rocamat, Puteaux, France

[21] Appl. No.: 561,020

[22] Filed: Dec. 14, 1983

[30] Foreign Application Priority Data

Dec. 15, 1982 [FR] France ................................ 82 21040

[51] Int. Cl.⁴ ............................................. B28D 1/02
[52] U.S. Cl. ..................................... 125/16 R; 83/748
[58] Field of Search ..................... 125/16 R, 16 L, 16, 125/17; 83/748, 751, 762

[56] References Cited

U.S. PATENT DOCUMENTS

| 180,344 | 7/1876 | Huffman | 125/16 R |
| 2,816,582 | 12/1957 | Von Sneidern | 83/751 |
| 3,197,921 | 8/1965 | Hohler | 51/103 R |
| 4,105,012 | 8/1978 | Hini | 125/16 R |

FOREIGN PATENT DOCUMENTS

| 1035463 | 4/1953 | France | 125/16 R |
| 2147 | 1/1964 | France | 125/16 R |

Primary Examiner—Harold D. Whitehead
Attorney, Agent, or Firm—Ralph H. Dougherty

[57] ABSTRACT

The device for cutting blocks of granite, marble, stone and other like materials by means of diamond blades displaced in a reciprocating movement by a blade carrying frame, said blade carrying frame being itself connected to a reciprocating motor unit, characterized in that at least the blade carrying frame is connected to a sliding frame by means of vibration damping means.

13 Claims, 7 Drawing Figures

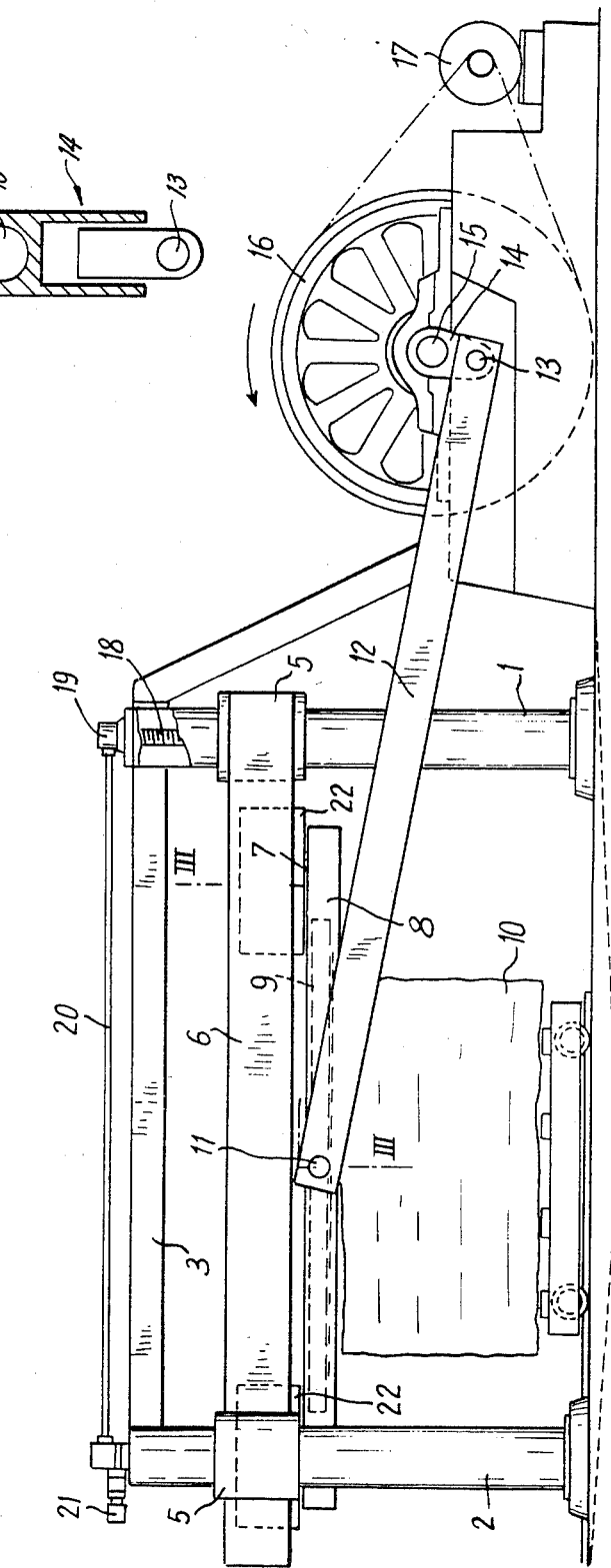

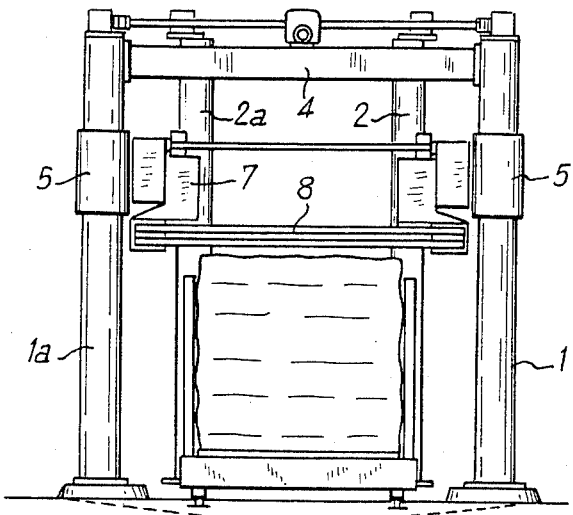
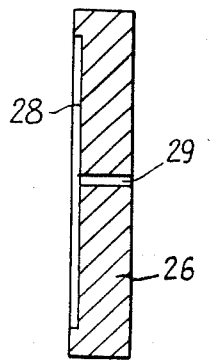
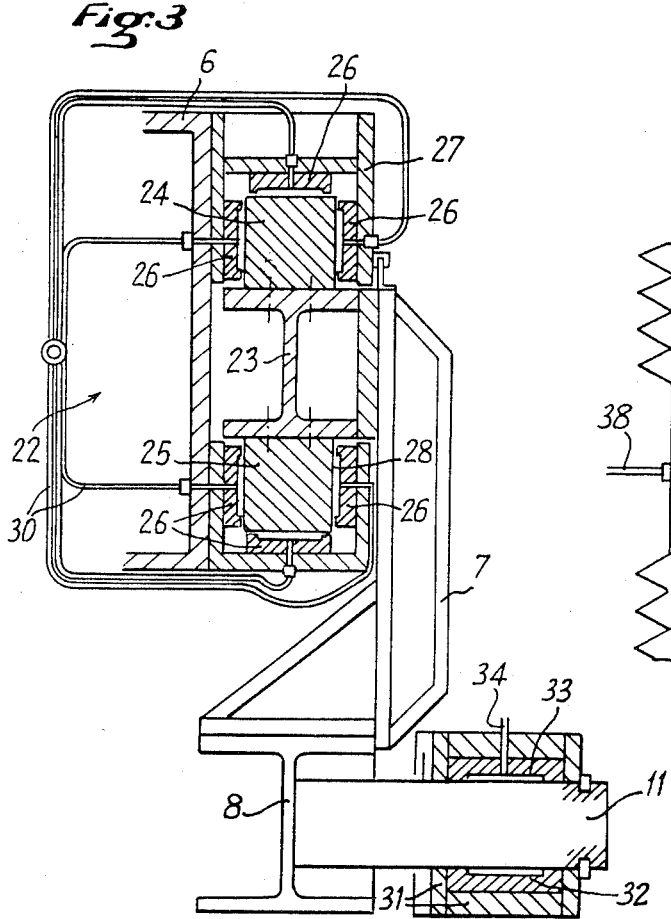
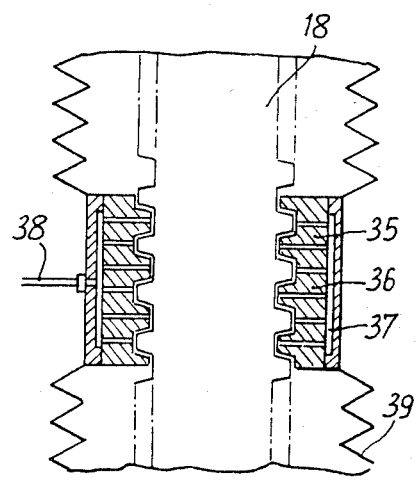

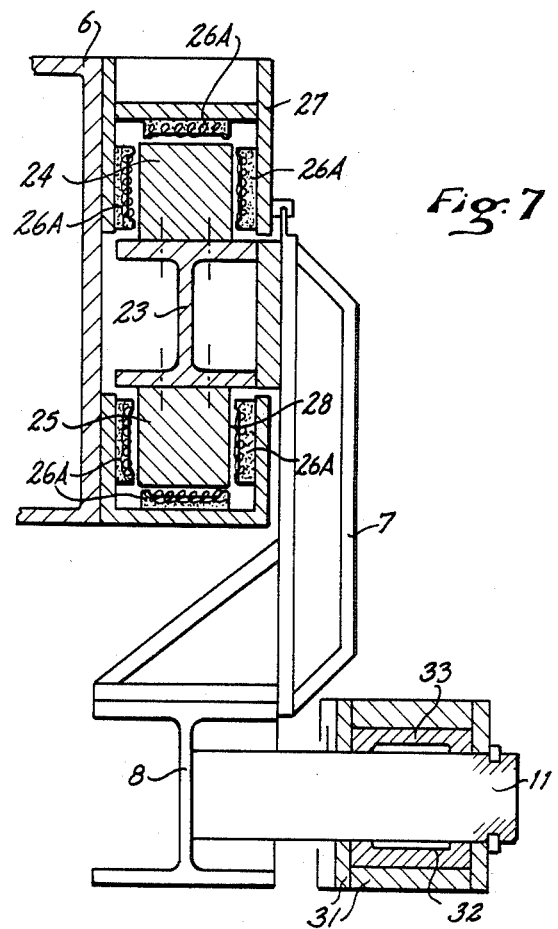

DEVICE FOR CUTTING BLOCKS OF GRANITE, MARBLE, STONE AND THE LIKE MATERIALS

FIELD OF THE INVENTION

The present invention relates to a new cutting device which can be used without modification for cutting any natural or artificial materials. The device comprises a plurality of blades placed in a frame which is supported for being moved in a reciprocating rectilinear movement or beneath a guiding frame, the guiding frame being itself vertically movable by use of jacks or cylinders.

BACKGROUND OF THE INVENTION

Multi-blade frame machines of this type are known and have been described for example in German Pat. No. 2,161,393, French Pat. No. 1,440,801, French Pat. No. 1,193,333, Belgium Pat. No. 661,521, and French Pat. No. 586,320, the disclosure of which is made an integral part of the present patent application.

However, it has not been possible up to now to make a multi-purpose machine for industrially sawing materials having an hardness as different as soft stone and granite by using diamond blades. Moreover, even though diamond sawing is well known in stone and marble sawing, there is presently ineffectiveness in performances of the tools and in the output production of corresponding sawing machines. Reasons for such ineffectiveness are as follows:

1—Diamond blade sawing of granite in particular sawing into thin slices, by use of existing multi-blade frame machines, cannot be embodied because of the too short useful life of the sawing tools. The only presently competitive method consists of interposing metal shot between the blades and the bottom of the sawing line.

2—Present designs of such machines accommodate only insignificant variations in the cutting parameters, and therefore it is not practicable to combine the cutting parameters for optimization of the cutting conditions.

3—In presently known machines, moving parts are guided by metal-on-metal contact of surfaces having a plurality of shapes, and despite their tolerances, the wear of the parts causes decreasing accuracy, followed by tansmittal of vibrations and impacts to the cutting tools, while simultaneously shortening the operating or useful life of the tools.

Prior art has also taught, for making bearing means or for guiding slides, devices of a fluid type which prevent or at least limit the friction between parts having to be relatively displaced. This is for example the case of German Pat. No. 904,946. French Pat. No. 69 17777, French Pat. No. 1,299,218, U.S. Pat. No. 3,466,951 and French Pat. No. 1,372,163, the disclosure of which is included in the present patent application.

OBJECTS AND SUMMARY OF THE INVENTION

The present invention creates a new machine which can be provided with one or a plurality of blades, and makes it possible to saw natural or artificial materials, whatever is their hardness to the diamond tool; and improves the quality of the sawn surfaces as well as the cutting conditions, the output production and therefore the production costs. It is also noted that improvements in the sawing quality make possible, by obtaining a better state of surface, to save an appreciable time on the ulterior surfacing and polishing steps.

According to the invention, in a device for cutting stone, marble, granite and the like materials by means of diamonded blades displaced in a reciprocating movement by a blade carrying frame, the blade carrying frame being itself connected to a reciprocating movement motor unit, at least the blade carrying frame is connected to a sliding frame through vibration damping elements. This embodiment makes possible to surprisingly avoid that the diamond sawing blades are submitted to vibrations during a sawing operation, and it results therefrom a very good cutting speed, a cutting accuracy which has never been previously reached and a lower wearing of the sawing blades, the diamond particles of which are not torn away nor otherwise deteriorated, with only a regular wear of the blades occurs.

Various further features of the present invention are moreover shown in the following detailed disclosure.

BRIEF DESCRIPTION OF THE DRAWINGS

Embodiments of the invention are shown as non limiting examples in the accompanying drawings, wherein:

FIG. 1 is a diagrammatic elevation view with parts broken away of a reciprocating sawing machine embodying the invention;

FIG. 2 is a front elevation view corresponding to FIG. 1;

FIG. 3 is a cross section of FIG. 1 taken substantially along line III—III of FIG. 1;

FIG. 4 is a detail of one of the components shown in FIG. 3;

FIG. 5 is diagrammatic cross-section of another detail of embodiment;

FIG. 6 shows the detail of the crankshaft connection for the embodiment of FIG. 1;

FIG. 7 is an alternative embodiment to that of FIG. 3.

DETAILED DESCRIPTION OF THE INVENTION

The machine shown in the drawings comprises rear uprights 1, 1a and front uprights 2, 2a which are for example placed at angles of a right angled trapezium. The uprights 1, 1a and 2, 2a are connected together by upper side members 3 and upper cross members 4. The uprights 1, 1a and 2, 2a are surrounded by guiding units 5 to which is fixed a slide carrying frame 6. The slide carrying frame 6 supports by means of suspension brackets 7 a blade carrying frame 8. The blades 9 of the frame 8 are provided for sawing a block 10, for example a block of granite.

The blade carrying frame 8 is laterally provided with at least one pin 11 for pivotally mounting a head of a connecting rod 12. The foot of the connecting rod 12 is pivotally mounted on a pin 13 provided at end of a crank-shaft 14. The crank-shaft 14 is wedged on a shaft 15 carrying an inertia wheel 16 driven by an electric motor 17. The electric motor 17 is preferably of a variable speed type.

The up and down movement of the blade carrying frame 8 is controlled by the movement of the slide carrying frame 6. In the example shown in the drawings, the movement of slide carrying frame 6 is provided by means of screws 18 placed in the uprights 1, 1a and 2, 2a. The rotation speed of the screws 18 is synchronized by transmission boxes 19 connected together by means of shafts 20 driven by a motor-reductor unit 21.

According to the present invention, for preventing propagation of the vibrations, a fluid type connection is provided between the various means submitted to a relative movement.

The blade carrying frame 8 is connected near its ends by means of the suspension brackets 7, to sliding devices 22. As shown in FIG. 3, an embodiment of each sliding device 22 comprises a profile member 23 on which slides 24, 25 are mounted. The slides 24, 25 are maintained between a set of shoes 26, three shoes in the present example. The shoes 26 are placed in a casing 27 which is itself fixed to the side members of the slide carrying frame 6.

Each shoe defines, in the side thereof facing the slide 24, at least one housing 28 which is fed with pressurized fluid, for example oil, through a channel 29. Ducts 30 are provided for feeding each housing 28.

The above mentioned embodiment enables to maintain the slides 24, 25 in a state closely related to a levitation state and has for its result to greatly reduce friction upon displacement of the blade carrying frame 8 relatively to the slide carrying frame 6, and most especially to prevent transmission of the vibrations caused, in particular, by friction between the blades 9 and the block 10 during the sawing operation, and the vibrations caused by the vertical and horizontal driving systems of the blade carrying frame 8.

A device similar to the sliding device 22 can be similarly embodied between the guiding units 5 and the uprights 1, 1a and 2, 2a.

As also shown in FIG. 3, the pin 11 on which is pivotally mounted the head of the connecting rod 12 comprises a fluid bearing box 31 containing curved shoes 32 forming a housing 33 which communicates with duct 34 for supplying a pressurized fluid.

By providing a similar construction for the pin 13 of the foot of the connecting rod 12, the motor unit 17, 16 is isolated from the blade carrying frame and, therefore, the vibrations emanating from either the blade carrying frame or the motor unit are suitably damped and/or filtered.

It is further possible to mount also the shaft 15 on fluid bearings as above described.

For preventing vibrations from being transmitted from or to the motor-reductor unit 21, the screws 18, the rotation of which causes a fall then a raise of the slide carrying frame 6, are connected to the slide carrying frame 6 by means of nuts 35 (FIG. 5) having a plurality of channels 36 connected to at least one collecting chamber 37 into which a pressurized fluid is supplied through a duct 38.

The drawings show that the channels 36 terminate at the bottom of the screw threads of the nut 35, which makes that the nut, the threads of which are machined relatively to these of the screw 18 is not in direct physical contact with the screw.

In order to prevent dirt from entering the fluid circuit and the threads of the nuts 35 and screws 18, the nuts 35 are provided with sealing bellows 39 or similar means.

The device of the invention which provides isolation of the various mobile parts, the one with respect to the other by means which damp and/or filter the vibrations makes possible to use cutting blades of the diamond type (i.e. blades in which abradant elements formed by diamonds are maintained in a matrix), from which a risk of tearing away of the diamonds is either prevented or at least greatly reduced. Vibrations are actually positively suppressed.

In order that the diamond blades are used at best of their characteristics, motor 17 is a variable speed type, which enables variation of the beating rate which is for example adjusted in dependence of the nature of the material of the block 10 to be sawn. As shown in FIG. 6, it is possible to realize at least the crank-shaft 14 in the form of a telescopic element of a known structure for varying the stroke of the blades, i.e. in particular for optimizing the stroke in function of the block 10 and the compositions of the tool for using always the blades at optimum sawing conditions. In this case, the speed of the motor 17 is adjusted so that the maximum linear speed reached by the blades will not exceed a predetermined threshold.

The motor-reductor unit 21 is itself preferably made also in the form of a variable speed unit in order that the speed of fall of the blades which determines the depth of each work-pass during their sliding movement does not exceed a predetermined threshold.

Although the screw 18 and nut 35 arrangement of FIG. 5 has been shown as a screw-jack, it is also possible to use known hydraulic sliding cylinders, the important point being that the cutting blades will always exert a constant unitary pressure on the material to be cut.

Although not shown in the drawings, it is obviously possible to displace the blade carrying frame 8 by means of hydraulic cylinders, preferably of the double action type, acting either directly on the blade carrying frame 8 or on the sliding devices 22. An hydraulic motor of a known type can be used instead of the motor-reductor unit 17 and inertia wheel 16 of FIG. 1.

In the embodiment of FIG. 7, which is a variation of the embodiment of FIG. 3, similar parts having the same reference numerals as in FIG. 3, the shoes 26 as well as the shoes 32 and the nut channels 36 can be formed by polar parts of electromagnetic windings which generate magnetic fields for maintaining in a levitation state the parts which must be isolated in order to prevent transmission of vibrations.

What is claimed is:

1. A device for cutting blocks of granite, marble, stone and similar materials, comprising:
    a plurality of sawing blades;
    a blade-carrying frame into which at least two sawing blades are fixed and having slide means for directing horizontal motion of said frame;
    a drive motor unit connected to said blade-carrying frame for displacing said sawing blade in a reciprocating motion,
    a slide-carrying frame of generally rectangular cross-section,
    upright supports,
    a guide unit on each upright support connected to said slide-carrying frame for directing vertical movement of said slide-carrying frame,
    said slide means of said blade-carrying frame being adapted to fit within said slide-carrying frame, and
    vibration damping means for creating pressure on the top, bottom, and each side of said slide means to urge said slide means away from contact with said slide-carrying frame, thus providing a vibration dampened connection between said slide-carrying frame and said blade-carrying frame, whereby propogation of vibrations to the sawing blades is minimized.

2. Apparatus according to claim 1 wherein said vibration damping means comprises horizontally spaced and opposed shoes, each having a cavity facing said slide member positioned between said horizontally spaced shoes, vertically spaced and opposed shoes each having a cavity facing said slide member between said vertically spaced shoes, each of said shoes being connected to a source of fluid under pressure, whereby pressurized fluid is introduced to the cavity within each of said shoes under sufficient pressure to force said slide away from each of said shoes, into a simulated state of levitation, thus providing damping of vibrations to the saw blades.

3. Apparatus according to claim 2 wherein said fluid is a liquid or a gas.

4. Apparatus according to claim 1 wherein the vibration damping means comprises: at least two sets of electromagnetic elements, one set being horizontally opposed within said slide-carrying frame and having said slide member disposed between them, the second set being vertically opposed within said frame and having said slide member disposed between them, each or said elements being connected to a source of electric power, whereby upon initiating current flow, each element establishes a repulsion force to repel the slide away from each of the elements and place it in a state simulating levitation.

5. Apparatus according to claim 1 wherein said guide units are connected to associated control means for raising and lowering the guide units and the associated slide carrying frame the exact same distance simultaneously on each upright support.

6. Apparatus according to claim 5 wherein said control means comprises a screw thread on said upright support which threadedly engages a portion of said guide unit, each guide unit including means for supplying pressurized fluid between the threads of said guide unit and said upright support.

7. Apparatus according to claim 6, further comprising means for synchronizing the rotational speed of the threaded portion of each upright support.

8. Apparatus according to claim 5 wherein the control means comprises a hydraulic cylinder integral with each upright support.

9. A device according to claim 1, wherein the blade carrying frame (8) is controlled by at least one connecting rod (12) of which one head (11) or foot (13) articulations is provided with fluid bearing means.

10. A device according to claim 9, wherein the connecting rod is driven by a variable speed motor unit to which it is connected by means of an inertia wheel (16), a shaft (13) and a crank-shaft (14).

11. Device according to claim 9, wherein the shaft (15) is mounted on fluid bearing means.

12. Device according to claim 10, wherein the crank-shaft (14) has an adjustable length.

13. A device according to claim 1, comprising means for maintaining constant a unitary pressure applying the diamonded blades on the block (10) to be cut.

* * * * *